United States Patent [19]
Butler

[11] Patent Number: 5,615,450
[45] Date of Patent: Apr. 1, 1997

[54] SKIRT FOR CASTER WHEELS

[76] Inventor: Robert Butler, 7968 Arjons Dr., No. 106, San Diego, Calif. 92126

[21] Appl. No.: 574,300

[22] Filed: Dec. 18, 1995

[51] Int. Cl.⁶ ................................................. B60B 33/00
[52] U.S. Cl. ..................................................... 16/18 CG
[58] Field of Search .......................................... 16/18 CG

[56] References Cited

U.S. PATENT DOCUMENTS

| | | | |
|---|---|---|---|
| 2,046,384 | 7/1936 | Katcher | 16/18 CG |
| 2,471,958 | 5/1949 | Humphreys | 16/18 CG |
| 3,083,398 | 4/1963 | Swalm | 16/18 CG |

FOREIGN PATENT DOCUMENTS

| | | | |
|---|---|---|---|
| 1207965 | 2/1960 | France | 16/18 CG |
| 415552 | 10/1946 | Italy | 16/18 CG |

*Primary Examiner*—Daniel W. Howell
*Assistant Examiner*—Donald M. Gurley
*Attorney, Agent, or Firm*—John R. Duncan; Frank D. Gilliam

[57] ABSTRACT

A skirt system for caster wheels to prevent a rolling caster from colliding with floor debris. A skirt assembly is fastened to a caster having a swiveling housing in which is mounted a caster wheel on an axle. The skirt thus swivels with the caster. The skirt assembly includes a circular skirt housing fastenable to a caster housing and having a central opening through which the caster wheel extends. Skirt material, such as brush fibers, is secured in a split ring which is removably held to the skirt housing by ring spring tension. The skirt may extend entirely around the caster or a segment may be portioned in front of the caster wheel.

10 Claims, 2 Drawing Sheets

SKIRT FOR CASTER WHEELS

BACKGROUND OF THE INVENTION

This invention relates in general to devices for protecting caster wheels from running against floor debris and, more particularly, to a skirt assembly mounted on a swiveling caster wheel to move and swivel with the wheel to sweep floor debris away from the caster.

Many structures, such as shopping carts, creepers used by auto mechanics, industrial carts, chairs, tables and the like are mounted on casters for ease of movement. Where there is debris such as pebbles, nuts, bolts, manufacturing scrap, or other small objects on the floor, the smooth movement of castered structures will be impeded. The user will have to stop, back up and attempt to change the path of movement to avoid the object. In addition to the resulting annoyance, where the structure is a loaded, high center of gravity shopping cart, electronic equipment cart, etc., the cart may tip over, damaging any items being transported and possibly injuring persons in the area. Where the structure is a swivel chair or a castered stool of the sort often used by industrial assemblers, the chair or stool may tip over, injuring the occupant.

In certain environments, such as textile mills, barber shops, carpeted areas and the like, strand materials such as threads, fibers, hairs are often scattered over the floor. As a castered structure is moved on such floors, in time the strands will accumulate at the swivel hub, getting between the caster and caster housing and between the axle and wheel. This makes moving the castered structure increasingly difficult and eventually can lead to tipping of the structure. Further, such strands are difficult and time consuming to remove from the caster.

Attempts have been made to develop caster accessories to reduce or eliminate these problems. Typically, a large diameter skirt having a wide housing within which the caster can swivel is fastened to the structure, as disclosed by Humphreys in U.S. Pat. No. 2,471,958 and Katcher in U.S. Pat. No. 2,046,386. A brush extends from the skirt into contact with the floor to push debris ahead of the caster path. Most casters have the wheel axle offset from the swiveling axes, so that the caster is trailing as the structure is moved, for ease of movement, resulting in a very large diameter skirt.

Where the skirt is directly fastened to the structure, the particular skirt system must be designed into the structure when it is manufactured and cannot be conveniently added later. In addition, these specialized systems cannot be easily disassembled for cleaning or repair.

Solid walled shields have been provided for casters to push solid debris away from moving casters, such as are described by Rainville in U.S. Pat. No. 5,371,920 and Jones in U.S. Pat. No. 3,818,542. These have relatively large diameters, since the caster must swivel within them. Further, they tend to snag on changes in floor elevation, such as thresholds or expansion strips in concrete floors where floor level changes slightly across the strip, causing the very problems of tipping or stopping that the skirt was intended to overcome.

Others have attempted to prevent dirt, fibers, string and the like from accumulating between the wheel support and wheel or around the wheel axle by providing brushes that bear against the wheel as the wheel rotates. Typical of these are the brush systems disclosed by Turbyfill in U.S. Pat. No. 2,923,017 and by Smith in U.S. Pat. No. 3,744,080. While these systems may aid in keeping fibers, lint, hair clippings, etc. out of the caster, they do nothing to prevent the caster encountering and bing stopped by solid debris.

Thus, there is a continuing need for improved caster systems that sweep solid debris away from the path of a moving caster, keep strand like material from tangling a caster axle or housing, are easily assembled and disassembled, can be easily retrofitted into existing caster systems and are compact, light weight and unobtrusive.

SUMMARY OF THE INVENTION

The above-noted problems, and others, are overcome by a skirt system for casters of the type having a caster housing in which a wheel is mounted on an axle with the axis of caster swiveling is offset from the axle axis so that the caster is always trailing as the castered structure is moved in different directions. A skirt housing engages the caster housing to swivel therewith. A flexible skirt material, such as a brush formed from fibers or narrow strips of stiff material or from a foam material, is mounted on the skirt housing and approximately contacts the surface upon which the caster moves.

The skirt material is preferably secured in a split ring that releasably fits into a groove in the skirt housing, for ease of installation and removal. Further, the skirt ring could be secured in place with an adhesive or the like. The skirt housing fits over the caster housing and is held in place by any suitable means, such as spot welds, brazing, screwed or bolted clips or brackets, etc. If desired the skirt and caster housings could be manufactured as a single piece. The skirt housing, skirt material and split ring can be provided as an accessory kit for many commercially available casters. No modifications of the structure using this caster system need be made to use the skirt system of this invention.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
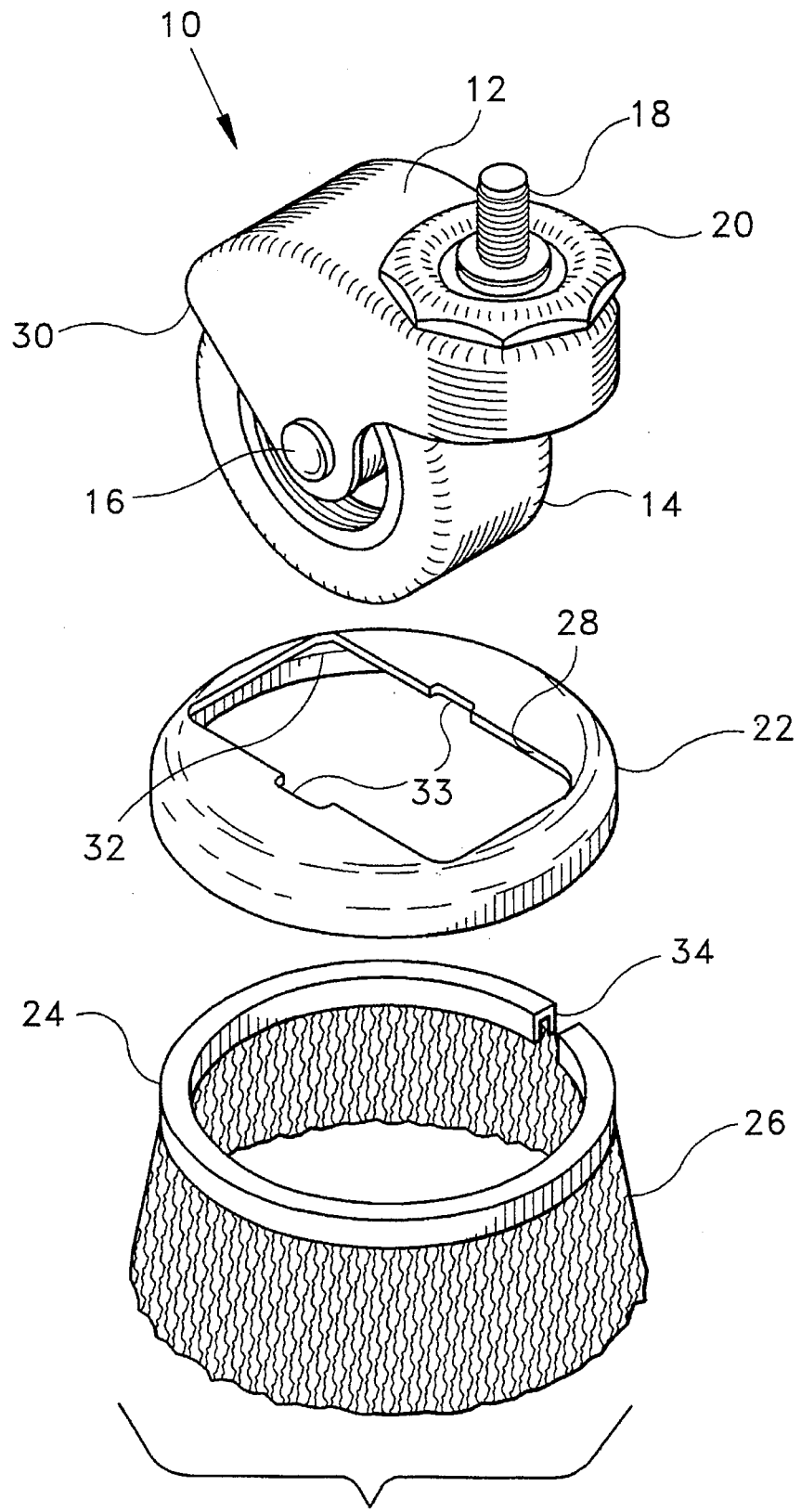
FIG. 1 is an exploded perspective view of the caster skirt system.

Referring to FIG. 1, there is seen a caster 10 having a housing 12 in which a wheel 14 is mounted via axle 16. Axle 16 is rivet-like, having an enlarged head on each end. Of course, a bolt or other axle configuration could be used, if desired.

A means for mounting caster 10 onto a structure is provided; in this case, a stud 18. Stud 18 is secured to one side of a ball bearing assembly 20 with the other side of the assembly secured to caster housing 12 so that housing 12 can rotate freely about the axis of stud 18.

The axis of axle 16 is offset from the axis of caster rotation, which in this case coincides with stud 18. With this arrangement, housing 12 will automatically swivel as the path of movement of the castered structure changes to always trail the rotation axis, resulting in easy and smooth swiveling. The skirt of this invention can also be used with fixed, non-swiveling casters.

Any suitable mounting means may be used in place of stud 18, including pins that snap into a tube in the castered structure, a plate fastened to the structure by plural screws, etc. In each case, the axis of rotation of caster housing 12 will be offset as shown.

As seen in FIG. 1, the skirt assembly is made up of a skirt housing 22, a split ring 24 and skirt material 26. Skirt housing 22 is installed onto caster housing 12 by inserting wheel 14 down into opening 28 until the upper surface of skirt housing 22 engages the undersurface 30 at the trailing end of caster housing 12. Notches 33 are provided as needed to provide clearance for the ends of axle 16.

Caster housing 12 may be fastened to skirt housing 22 in any suitable manner. Generally, spot welds 36 are preferred as solid, permanent and convenient. If desired small "L" shaped brackets or the like could be overlap caster housing 12 and skirt housing 22 at their line of contact and be secured by rivets, small bolts, screws, etc.

A groove 32 around the inner wall of skirt housing 22 is sized to receive split ring 24. Split ring 24 is compressed to close gap 34 and the ring is pushed up into housing 22 to align with groove 32, then is released. Spring tension in split ring 24 expands the ring to seat in groove 32. While metal is preferred, split ring 24 and housing 22 may be formed from any suitable material such as plastics. Ring 24 is preferably circular in shape for most applications. However, if desired the ring may be oval, elliptical or have other configurations.

Any suitable properly flexible material may be used for skirt material 26. Typically, flexible, stiff, fibers or narrow strips or a flexible foam ring may be used. If desired, a thin rubber band or the like may be placed around the fiber array to strengthen the fibers and prevent sharp objects such as screwdriver blades from penetrating between fibers. For optimum performance, metal or stiff plastic fibers, preferably crimped to a zig-sag configuration, would be used. The fibers preferably extend to approximately the plane of the surface upon which wheel 14 rolls.

Figure 2:
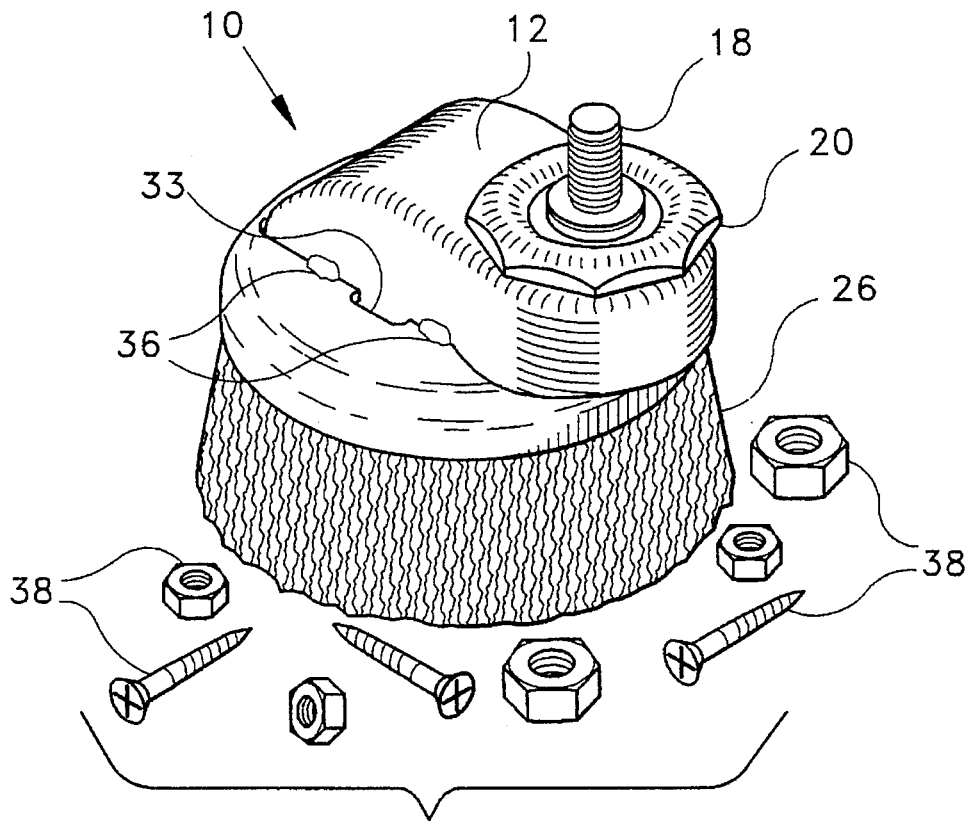
FIG. 2 is a perspective view of the assembled skirt system in use.

As illustrated in FIG. 2, when caster 10 rolls across a floor littered with debris such as nuts and screws 38, skirt 26 will push the debris out of the way. Where there is a large amount of debris, the material may pile up somewhat in front of caster 10 where the caster is moved some distance in a straight line. However, with even a slight deviation from a straight path will cause the skirt to swivel with the caster wheel, pushing debris to the side. A large skirt fastened to the castered structure and that does not swivel with the caster will not have this ability.

Figure 3:
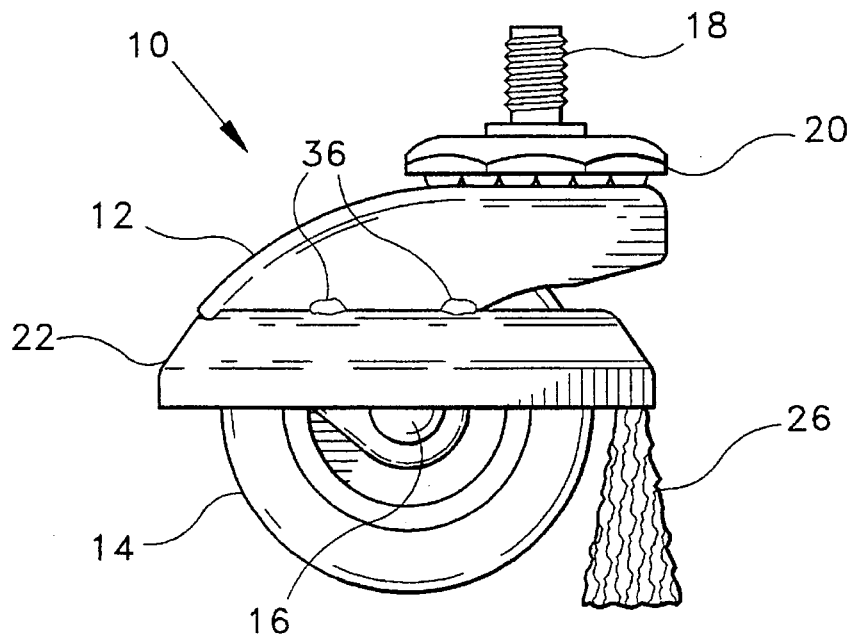
FIG. 3 is an elevation view of an alternate embodiment of the skirt system.

While the full skirt of FIGS. 1 and 2 is generally preferred, if desired, skirt material 26 may be fastened to only a small part of ring 24 and positioned in front of wheel 14, as seen in the alternate embodiment of FIG. 3. Because the caster swivels and the skirt is carried with the caster, the segment of skirt will always precede wheel 14 as caster 10 rolls in different directions.

While certain specific relationships, materials and other parameters have been detailed in the above description of preferred embodiments, those can be varied, where suitable, with similar results. Other applications, variations and ramifications of the present invention will occur to those skilled in the art upon reading the present disclosure. Those are intended to be included within the scope of this invention as defined in the appended claims.

I claim:

1. A caster wheel skirt system which comprises:

a caster housing;

an axle secured to said housing;

a wheel mounted for rotation on said axle, said wheel extending beyond a lower side of said caster housing to roll on a plane surface;

means for axially mounting said caster housing on a structure, with axes of said caster mounting means and axle offset;

swivel means between said caster mounting means axis and said caster mounting means for allowing said axle to swivel about a generally vertical axis;

a skirt housing secured to said lower side of said caster housing;

flexible skirt means extending from a skirt holder secured to said skirt housing to a plane approximately corresponding to said plane surface;

whereby said skirt is closely adjacent to said wheel and swivels with said wheel to clear debris from adjacent to said wheel as said wheel rolls.

2. The caster wheel skirt system according to claim 1 wherein said skirt housing includes an internal circular groove and said skirt means includes a circular split ring having flexible skirt material extending therefrom, said split ring releasably fitting within said groove.

3. The caster wheel skirt system according to claim 1 wherein said flexible skirt means extends substantially entirely around said caster wheel.

4. The caster wheel skirt system according to claim 1 wherein said flexible skirt means extends only in a region adjacent to said wheel in a direction toward which said wheel rolls.

5. The caster wheel skirt system according to claim 1 wherein said flexible skirt means comprises a flexible skirt material extending from a ring, said skirt material selected from the group consisting of fibers, strips and plastic foam material.

6. In a caster system which comprises a caster housing, an axle secured to said housing, a wheel mounted for rotation on said axle, said wheel extending from a lower side of said caster housing to roll on a generally planar surface, means for axially mounting said caster housing on a structure, with axes of said caster mounting means and axle offset, swivel means between said caster mounting means axis and said caster mounting means for allowing said axle to swivel about a generally vertical axis; the improvement comprising:

a skirt housing engaging said caster housing for swiveling therewith, and flexible skirt means extending from a skirt holder secured to said skirt housing to a plane approximately corresponding to said generally planar surface.

7. The improvement according to claim 6 wherein said skirt housing includes an internal circular groove and said flexible skirt means includes a circular split ring having flexible skirt material extending therefrom, said split ring releasably fitting within said groove.

8. The improvement according to claim 6 wherein said flexible skirt means extends substantially entirely around said caster wheel.

9. The improvement according to claim 6 wherein said flexible skirt means extends only in a region adjacent to said wheel in a direction toward which said wheel rolls.

10. The improvement according to claim 6 wherein said flexible skirt means comprises a flexible skirt material extending from a ring, said skirt material selected from the group consisting of fibers, strips and plastic foam material.

* * * * *